United States Patent Office 2,932,550
Patented Apr. 12, 1960

2,932,550

ACID PRETREATMENT OF POLYACRYLONITRILE-TYPE FIBERS AND THE TREATED FIBERS

Leslie L. Walmsley, Swarthmore, Pa., assignor, by mesne assignments, to The Chemstrand Corporation, Philadelphia, Pa., a corporation of Delaware No Drawing. Application October 14, 1953
Serial No. 386,137

13 Claims. (Cl. 8—21)

This invention relates to a process of pretreating certain acrylic fibers and more particularly, it relates to a method for treating fibers containing acrylonitrile and certain basic monomers in polymeric form with aqueous acid solutions to improve their affinity for anionic substances such as dyes, dye intermediates, and surface active agents, and in particular acid and direct dyestuffs.

It is well known that polyacrylonitrile and copolymers of acrylonitrile and other mono-olefinic polymerizable monomers are excellent fiber-forming materials. The polyacrylonitrile and copolymers of more than 80 percent acrylonitrile and up to 20 percent of other polymerizable monomers produce fibers with superior tensile properties, desirable elongation, and excellent stability under a wide range of physical and chemical conditions. However, these polymers are subject to inherent disabilities which greatly restrict their utility in the fabrication of general purpose fibers. For example, the fibers do not have sufficient dye affinity to enable the development of satisfactory colored fibers, and the limited range of colors produced by conventional dyeing techniques are not stable to laundering and dry cleaning procedures.

The dye-receptivity of acrylonitrile polymers has been greatly improved by utilizing as the comonomer certain basic compounds, particularly heterocyclic compounds containing a tertiary nitrogen in the ring and substituted with a polymerizable alkenyl group. For example, Arnold U.S. Patent No. 2,491,471 describes copolymers containing from 2 to 10 percent recurring vinylpyridine units, the remainder of the copolymer consisting of acrylonitrile units. In copending application, Serial No. 214,231, filed March 6, 1951, by Julian Keith Lawson, there are described and claimed copolymers of from 80 to 98 percent by weight of acrylonitrile and from 2 to 20 percent of a vinylimidazole. Still further improvements in dye-receptivity and other properties of acrylonitrile fibers have been effected by blending polymers or copolymers of acrylonitrile containing at least 80 percent of acrylonitrile in polymeric form with a second copolymer containing at least 30 percent of a basic monomer which is preferably a heterocyclic compound containing a tertiary nitrogen atom in the ring and a polymerizable alkenyl group substituted thereon. As an example of blends of this type reference is made to U.S. Patent No. 2,603,621, wherein are described and claimed blends of fiber-forming acrylonitrile polymers with polymers containing N-vinylimidazole as the basic monomer. These blends may have as the principle polymer from 70 to 98 percent of a copolymer of 80 or more percent acrylonitrile and minor proportions of monomers copolymerizable therewith. The other blend constituent is a polymer of 30 or more percent of the basic monomer and up to 70 percent of another copolymerizable monomer. The two components of the blended copolymers are proportioned so as to provide from 2 to 10 percent of the basic monomer in polymerized form in the final blend. Suitable basic monomers are the unsaturated imidazoles, benzimidazoles, imidazolines, oxazoles, benzoxazoles, benzothiazoles, pyridazines, pyrimidines, pyrazines, pyrazoles, pyrroles, triazines, quinolines, pyridines, thiazoles, and lactams. Suitable examples of monomers of the above enumerated types are given in U.S. Patent No. 2,643,990. Other suitable basic monomers are the basic acrylamides, such as those described in U.S. Patent No. 2,649,438. Preferred basic monomers are the unsaturated pyridines and the unsaturated imidazoles.

The monomers for copolymerization with acrylonitrile to form the fiber-forming polymers, and for copolymerization with the basic monomer to form the dye-receptive polymers, are not a critical feature of this invention and, therefore, can be any of the well-known monomers which are copolymerizable with acrylonitrile or the basic monomer. Among the useful monomers for copolymerization with acrylonitrile to form the fiber-forming polymers may be mentioned vinyl acetate and other vinyl esters of mono-carboxylic acids having up to four carbon atoms, methyl methacrylate, and other alkyl methacrylates having up to four carbon atoms in the alkyl radical, methyl acrylate and other alkyl acrylates having up to four carbon atoms in the alkyl group, dimethylfumarate and other dialkyl fumarates having up to four carbon atoms in the alkyl groups, dimethyl maleate and other dialkyl maleates having up to four carbon atoms in the alkyl groups, styrene, alpha-methyl styrene, and other vinyl or isopropenyl substituted aromatic hydrocarbons, vinyl chloroacetate and other vinyl esters of halo substituted acetic acids, vinylidene chloride, vinyl chloride, and methacrylonitrile. Useful monomers for polymerization with the basic monomer are styrene, alpha-methyl styrene, vinyl chloride, vinylidene chloride, vinyl acetate, acrylonitrile, methacrylonitrile, acrylic acid, methacrylic acid, the alkyl acrylates, the alkyl methacrylates, vinyl ethers, alkyl crotonates, the alkyl maleates, the alkyl fumarates, butadiene, isoprene, and chloroprene. Since the copolymers of the basic monomers with acrylonitrile have good thermal stability and solvent resistance, these copolymers are usually preferred.

The present invention is concerned with improving the dyeing properties of both blends and copolymers which are comprised of from 2 to 10 percent of an N-heterocyclic monomer of the types described above and at least 80 percent of acrylonitrile, both in polymeric form, and for brevity throughout the remainder of this specification and the appended claims the terms "polymeric fibers containing at least 80% by weight of acrylonitrile in polymeric form and from 2 to 10 percent of an N-heterocyclic monomer in polymeric form" will be used to designate generically fibers made from any of the copolymers or blends mentioned above.

Although as previously mentioned, incorporation of the dye-receptive monomers has enabled the production of fibers having greatly improved dye-receptivity, particularly as regards acid type dyestuffs, it has nevertheless been necessary that the dyebath utilized contain some strong acid, usually at least as much acid percentagewise as dyestuff. The necessity for adding strong acid has not been particularly serious when these acrylic fibers containing the basic nitrogen have been dyed alone, but has presented serious problems when it is proposed to dye yarns or fabrics comprising a blend of hydrophilic type fibers with the acrylic fibers. With wool blends, the problem has been chiefly to raise the relative affinity of the acrylic fibers so that good union could be achieved. For most acid dyes, wool has a greater affinity than even the modified acrylic fibers contemplated by this invention, so that union dyeing, especially in the medium and heavy shades, has not been practical.

An even more serious problem has existed in connection with attempts to union dye yarns or fabrics containing the above-described acrylic fibers and cellulose base hydrophilic type fibers such as cotton and viscose rayon. The strong acid, which is necessary in the dyebath to effect acid dyeing of the acrylic fibers, causes acid-tendering of the cellulosic fibers and in some instances causes severe degradation of the fibers through hydrolysis.

Even in those instances where the particular acrylic fibers are dyed alone, that is, not blended with hydrophilic fibers, the necessity for using a strong acid in the dyebath has seriously hampered the development of these fibers to the fullest possible extent. One reason for this has been the reluctance on the part of dyers to add the needed quantities of strong acid to dyebaths due to the possibility of damage to dyeing equipment by the acid.

It is, accordingly, the primary object of this invention to provide a method whereby fibers of polymeric materials containing at least 80 percent by weight of acrylonitrile in polymeric form and from 2 to 10 percent of an N-heterocyclic monomer in polymeric form can be dyed with acid or direct type dyestuffs without the necessity of adding damaging quantities of strong acid to the dyebath. Another object of this invention is to provide a method for dyeing yarns comprising a blend of a hydrophilic type fiber with the particular acrylic fibers without the disadvantage of causing damage to the hydrophilic fibers or without appreciably increasing the affinity for acid dyestuffs of the hydrophilic fibers. Still another object of this invention is to provide a method for union dyeing of yarns comprising a blend of hydrophilic type fibers with particular acrylic type fibers. Still another object is to provide a method for cross-dyeing of yarns of such composition. Other objects of the invention will become apparent from the description hereinafter.

The objects of the invention are accomplished in general by treating filaments or fibers, comprising polymerized acrylonitrile and polymerized basic monomers, for from one second to one minute with an aqueous acid solution of from 1 to 10 percent concentration at temperatures between about 100° F. and 212° F. The fibers, or fabric, are then rinsed with water or an alkaline solution to remove excess acid, after which the acrylic fiber will be found to dye readily with an acid or direct dye applied from a substantially neutral dyebath.

The pretreatment of the acrylic fibers in accordance with this invention can be carried out at any point between the actual preparation of the fibers and the addition of the fibers to the dyebath. For example, the tow of the polymeric material, during the actual spinning operation, can be passed through an acid bath to effect the necessary treatment. Likewise, the fibers can be treated before or after formation of yarns or fabrics therefrom.

The acid pretreatment is effected by the use of aqueous solutions of acids, both organic and inorganic, having dissociation constants (K at 25° C.) of about $1.76 \times 10^{-4}$ or greater. As examples of suitable acids there may be mentioned sulfuric acid, nitric acid, hydrochloric acid, phosphoric acid, formic acid, dichloroacetic acid, iodic acid, maleic acid, oxalic acid, pyrophosphoric acid, sulfurous acid, and trichloroacetic acid. Pretreatment with acetic acid ($K=1.75 \times 10^{-5}$) under the conditions of this invention fails to increase the dye affinity of the acrylic-basic fibers to any appreciable extent.

The treating time varies inversely with the concentration and strength of the acid, and the choice of time, temperature and concentration of acid is influenced principally by the depth of shade desired. For example, medium shades may be obtained by treating with stronger acids, such as nitric acid, of 1.0 percent concentration for one second at temperatures of about 160° F. For medium shades pretreatment with weaker acids requires higher concentrations of acids for longer times and at higher temperatures. Optimum results are obtained at temperatures near the boiling point, but equivalent results are obtained at lower temperatures provided additional time is allowed for penetration of acid into the fibers. If desired, a suitable wetting or penetrating agent may be employed to expedite penetration of acid. Upon completion of the acid treatment the treated material is rinsed thoroughly in water or alkaline solution to free the material of unadsorbed acid.

Fibers prepared from acrylonitrile-basic polymeric materials treated in accordance with this invention are directly dyed with acid or direct dyestuffs from a neutral dyebath. Preferably, the treated material is placed in a cold neutral dyebath, with or without the usual dyeing assistants, and the temperature raised gradually to 200°–212° F. Satisfactory dye exhaustion can thus be achieved, with no further additions, in about 30 minutes time at the boil. In blended fabrics of wool with acrylic fibers treated as heretofore described, the relative affinity of the acrylic fiber will be found to be considerably increased so that a wide range of union shades can be obtained in a single dyebath. Union dyeing of the treated acrylic fibers and cellulosic fibers may be accomplished by dyeing both the acrylic fibers and the cellulosic fibers simultaneously with selected direct dyes. Alternatively, these unions may be obtained by first exhausting acid dyes on the acrylic-basic fibers from a neutral dyebath as described, and then dyeing the cellulosic fibers in accordance with usual procedures. If it is desired to effect the dyeing in a single dyebath, it is generally desirable to neutralize this bath after exhaustion of acid dye on the acrylic fibers and before addition of direct dyestuffs to the bath. This prevents staining of the acrylic fibers by direct dyes and also prevents precipitation of the direct dyes which sometimes occurs in an acid bath.

While the mechanism of the acid pretreatment in accordance with this invention is not completely understood and it is not intended to restrict the invention to any theoretical explanation thereof, it is believed that some of the tertiary nitrogen atoms present in the polymeric material are first neutralized by the acid.

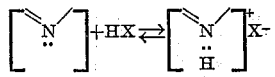

In the dyebath the dye anion exchanges with the anion of the acid.

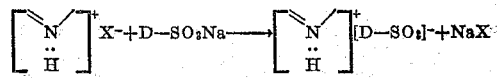

The function of the strong acid in the dyebath, when untreated fibers are to be dyed, is to convert the dyestuff into the acid form so that the dye anion can attach to the cationic portion of the polymer.

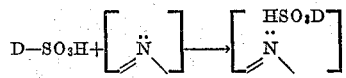

By neutralizing the tertiary nitrogen by treatment with acids, the necessity for the use of sulfuric or other strong acids in the dyebath is thus obviated or minimized.

Infrared examination of fibers pretreated in accordance with the process of this invention reveals no sign of hydrolysis or other chemical change in structure of the polymeric material, thus substantiating the theory that the improvements result from the residual acid remaining in the fibers. The theory is further supported by the results of test wherein partially hydrolyzed polyacrylonitrile was blended with a copolymer containing 50 percent by weight of acrylonitrile and 50 percent of 2-methyl-5-vinylpyridine, to give an overall methyl vinylpyridine content of 6 percent. Fibers prepared from this blend did not show the same degree of dyeability as fibers prepared from the same blend except that the polyacrylonitrile was not partially hydrolyzed. It has also been demonstrated that the dye affinity of fibers treated in accordance with the process of this invention can be reduced to that of identical untreated fibers by washing with strong alkali at the boil for a sufficient period of time to remove the residual acid.

In addition to the advantages already enumerated, the pretreatment method of this invention makes it possible to obtain much deeper shades when dyeing acrylonitrile-basic fibers and also gives increased wash fastness to such materials.

The following specific examples, which illustrate but do not limit the invention and in which parts, proportions, and percentages are by weight unless otherwise specified, illustrate preferred modes of operating in accordance with the principles of this invention.

Example I

Ten parts of fibers obtained by wet spinning a blend of 88 percent of a copolymer containing 94 percent by weight of acrylonitrile and 6 percent of vinyl acetate and 12 percent of a second copolymer containing 50 percent acrylonitrile by weight and 50 percent of 2-methyl-5-vinylpyridine, were immersed for five seconds in a solution of 50 parts of concentrated nitric acid and 950 parts of water heated at 204° F. The fibers were then rinsed in distilled water; immersed for one minute in a solution of one part of sodium carbonate and 1,000 parts of water at 122° F., rinsed again with distilled water and dried at 158° F.

Five parts of the pretreated fiber were immersed in a dyebath consisting of 200 parts water, 0.5 part glacial acetic acid and 0.1 part Calcosid Alizarin Blue SAPX. After boiling for one hour the yarn was dyed a strong shade of blue. In comparison, similar yarn which had not been pretreated and which was dyed in exactly the same fashion was colored only to a very light shade.

Example II

During the spinning of fibers of the composition described in Example I, the fibers were passed through a one percent aqueous solution of nitric acid placed at a point immediately after the washing drums and before the drying drums. The nitric acid solution was maintained at 100° F. and the fibers immersed for approximately one second.

Upon completion of the spinning the pretreated fibers were dyed in the same manner as described in Example I. The fibers were dyed a strong shade of blue. In comparison, similar fibers which had not been pretreated and which were dyed in the same fashion were colored only to a very light shade.

Example III

A knitted sample containing 50 percent wool and 50 percent of the acrylic fibers having the composition described in Example I, after acid pretreatment of the acrylic fibers as described, was entered into a 40:1 dyebath made up to contain the following (all percentages based on the total fiber weight):

| | Percent |
|---|---|
| Calcosid Alizarin Blue SAPX | 2.0 |
| Sulfuric acid | 4.0 |
| Glauber's salt | 5.0 |

The dyebath was heated to 120° F. and the sample then entered. The temperature was raised gradually to 205° F. over a period of 20 to 30 minutes. The dyeing was then run at this temperature for an additional 30 minutes. Practically complete exhaustion and uniform coverage of both fibers was obtained.

Example IV

A blend of fibers containing 50 percent viscose rayon and 50% acrylic fibers of the composition described in Example I, and after acid treatment of the acrylic fibers as therein described, was placed in a 40:1 dyebath containing 4.0 percent Acid Black G and 0.5 Brilliant Croceine Scarlet MOO (percentages based on total fiber weight) at 120° F. and the bath was raised to the boil in 15 minutes. After 30 minutes at the boil the bath was cooled to 120° F. and the pH adjusted to 5.0 with sodium bicarbonate. At this point, the acrylic fibers had been dyed black and had substantially exhausted the acid dyes from the bath.

There was then added 5.0 percent Cuprophenyl Black RL to the dyebath, the temperature raised to 160° F. in about 15 minutes, and 20 percent sodium chloride added. After boiling for an additional 15 minutes, 20 percent sodium chloride was again added, and boiling continued for 15 to 30 minutes to complete exhaustion of the direct dye. The material was then rinsed and after-treated with 3.0 percent $CuSO_4$ and 1.0 percent formic acid for 15 minutes at 160° F. Scouring was effected with one percent anionic detergent and 0.5 percent tetrasodium pyrophosphate at 160° F. for 15 minutes, followed by rinsing.

This procedure gave close union dyeing of the acrylic fibers and the viscose fibers, and the dyed material had quite satisfactory fastness properties. Similar union dyeings have been made even more readily in medium shades with the non-after-treatment direct dyes, using acid dyes for the acrylic fibers.

Example V

The procedure of Example I was repeated using sulfuric acid, hydrochloric acid, phosphoric acid, diglycollic acid and formic acid at concentrations varying between one percent and 10 percent. With the weaker acids, e.g. formic acid, optimum dyeing results were obtained only in medium shades and at concentrations approaching 10 percent. Samples were dyed to fairly deep shades after pretreatment with the stronger acids at concentrations as low as one percent.

This invention is not to be limited to the use of the particular acid and direct dyestuffs shown in the specific examples. The acid and direct type dyestuffs are well recognized classes of dyes and the invention is directed to the dyes as a class. Neither is the invention to be limited to pretreatment with the acids mentioned in the examples; similar, and in some cases superior, results have been obtained with the other acids mentioned heretofore.

The polymeric material utilized in the process of this invention may be produced by any of the known polymerization procedures, and the filaments, fibers or yarns may be produced by either the wet, dry, or melt-spinning technique.

I claim:

1. The process of increasing the affinity for acid and direct dyes of polymeric fibers containing at least 80 percent by weight of acrylonitrile in polymeric form and from 2 to 10 percent of an N-heterocyclic monomer in polymeric form which comprises treating such fibers with an aqueous solution containing as the sole active ingredient from 1.0 to 10 percent of an acid having a dissociation constant at least about $1.76 \times 10^{-4}$, at elevated temperatures and for from about one second to about one minute, and then washing the fibers free of excess acid.

2. The process of increasing the affinity for acid and direct dyes of polymeric fibers containing at least 80 percent by weight of acrylonitrile in polymeric form and from 2 to 10 percent of a vinylpyridine in polymeric form, which comprises treating such fibers with an aqueous solution containing as the sole active ingredient from 1.0 to 10 percent of an acid having a dissociation constant at least about $1.76 \times 10^{-4}$, at temperatures between about 100° F. and 212° F. for from one second to one minute, and washing the fibers free of excess acid.

3. The process of claim 1 wherein the polymeric fibers are comprised of a polymer of at least 80 percent by weight of acrylonitrile and from 2 to 10% of an N-heterocyclic monomer.

4. The process of claim 1 wherein the polymeric fibers are prepared from a blend of a polymer containing at least 80 percent by weight of acrylonitrile with a second polymer containing at least 30 percent by weight of an N-heterocyclic monomer.

5. The process of claim 1 wherein the treated fibers are washed with an alkaline solution.

6. The process of claim 1 wherein the acid is sulfuric acid.

7. The process of claim 1 wherein the acid is nitric acid.

8. The process of claim 1 wherein the acid is phosphoric acid.

9. The process of making blended fabrics of approximately the same shade, containing polymeric fibers containing at least 80 percent by weight of acrylonitrile in polymeric form and from 2 to 10 percent of an N-heterocyclic monomer in polymeric form, and hydrophilic fibers, which comprises treating the polymeric fibers with a 1.0 to 10% aqueous solution containing as the sole active ingredient an acid having a dissociation constant at least about $1.76 \times 10^{-4}$ for from one second to one minute at temperatures between 100° F. and 212° F., washing the fibers free of excess acid and drying, blending the treated polymeric fibers with hydrophilic fibers and then dyeing the blend to an approximately uniform shade in a substantially neutral dyebath.

10. The process of treating textiles which comprises treating polymeric fibers containing at least 80 percent by weight of acrylonitrile in polymeric form and from 2 to 10 percent of an N-heterocyclic monomer in polymeric form with a one to 10 percent aqueous solution containing as the sole active ingredient an acid having a dissociation constant at least about $1.76 \times 10^{-4}$ for from one second to one minute at a temperature between 100° F. and 212° F., washing the fibers free of excess acid and drying, blending the treated fibers with wool and dyeing the blended fibers to approximately the same shade with an acid dyestuff.

11. The process of treating textiles which comprises treating polymeric fibers containing at least 80 percent by weight of acrylonitrile in polymeric form and from 2 to 10 percent of an N-heterocyclic monomer in polymeric form with a one to 10 percent aqueous solution containing as the sole active ingredient an acid having a dissociation constant at least about $1.76 \times 10^{-4}$ for from one second to one minute at temperatures between 100° F. and 212° F., washing the fibers free of excess acid and drying, blending the treated fibers with fibers selected from the group consisting of cotton and rayon and dyeing the blended fibers to approximately the same shade with a direct dyestuff.

12. The product produced by the process of claim 1.

13. An undyed textile material comprising a blend of fibers treated by the process of claim 1 and hydrophilic fibers.

References Cited in the file of this patent

UNITED STATES PATENTS

| | | |
|---|---|---|
| 2,356,767 | Kropa | Aug. 29, 1944 |
| 2,548,853 | Baker | Apr. 17, 1951 |
| 2,613,194 | Craig | Oct. 7, 1952 |

FOREIGN PATENTS

| | | |
|---|---|---|
| 682,694 | Great Britain | Nov. 12, 1952 |
| 905,038 | France | Mar. 26, 1945 |
| 918,532 | France | Oct. 28, 1946 |

OTHER REFERENCES

Am. Dyestuff Reporter for Mar. 17, 1952, pp. 161, 162.
Am. Dyestuff Reporter for Sept. 17, 1951, p. P600.
"This is Orlon Acrylic Fiber," pamphlet pub. by Du Pont, Wilmington, Del., November 1948, p. 13, graph II.